United States Patent [19]
Anwar

[11] Patent Number: 6,019,202
[45] Date of Patent: Feb. 1, 2000

[54] FULL THROTTLE DIRECTIONAL SHIFT

[75] Inventor: Sohel Anwar, Naperville, Ill.

[73] Assignee: Caterpillar Inc., Peoria, Ill.

[21] Appl. No.: 09/257,776

[22] Filed: Feb. 25, 1999

Related U.S. Application Data

[60] Provisional application No. 60/113,472, Dec. 23, 1998.

[51] Int. Cl.$^7$ ..................................................... B60K 41/28
[52] U.S. Cl. ...................... 192/3.23; 192/3.58; 192/221; 192/13 R; 74/731.1
[58] Field of Search ................................ 192/3.21, 3.23, 192/3.25, 3.26, 3.3, 3.31, 3.33, 3.58, 221, 13 R, 103 F; 74/731.1, 732.1, 336 R; 477/65, 175

[56] References Cited

U.S. PATENT DOCUMENTS

| | | | |
|---|---|---|---|
| 5,040,648 | 8/1991 | Mitchell et al. | 192/3.58 |
| 5,042,314 | 8/1991 | Rytter et al. | 74/335 |
| 5,380,257 | 1/1995 | Coffman et al. | 477/175 |
| 5,509,520 | 4/1996 | Evans et al. | 192/3.23 |
| 5,613,581 | 3/1997 | Fonkalsrud et al. | 192/3.23 |

OTHER PUBLICATIONS

Article Analysis and Control of Nonlinear Systems by J. Karl Hedrick journal of Dynamic Systems, Measurement and Control Jun. 1993, vol. 115/351.

Article—98EIC-7 Sliding Mode Control of Large Wheel Loader Power–train for Full Throttle Directional Shifts by Sohel Anwar, Apr. 1998.

Article—Tech Paper 54171 Development of Nonlinear Algorithms For Engine Torque Control Using Throttle Angle and Spark Advance, May 1987.

*Primary Examiner*—Richard M. Lorence
*Attorney, Agent, or Firm*—Steven G. Kibby

[57] ABSTRACT

An electrohydraulic control device for a drive train of a machine having an engine, a transmission, and a torque converter utilizes sliding mode control and a target speed trajectory to constrain the jerk on the machine during a directional shift. Electrohydraulic valves produce fluid flow to hydraulic service brakes and an impeller clutch in the torque converter to controllably engage and disengage the transmission impeller clutch. A sensor generates a signal representative of the output speed of the transmission. An electronic controller receives the sensed speed signal, determines a desired speed signal according to the target speed trajectory, produces an error speed signal in response to a difference between the sensed and desired speeds, and controllably actuates the electrohydraulic valve to reduced any speed error, thereby changing the direction of motion of the machine under controlled jerk levels felt by the operator.

10 Claims, 3 Drawing Sheets

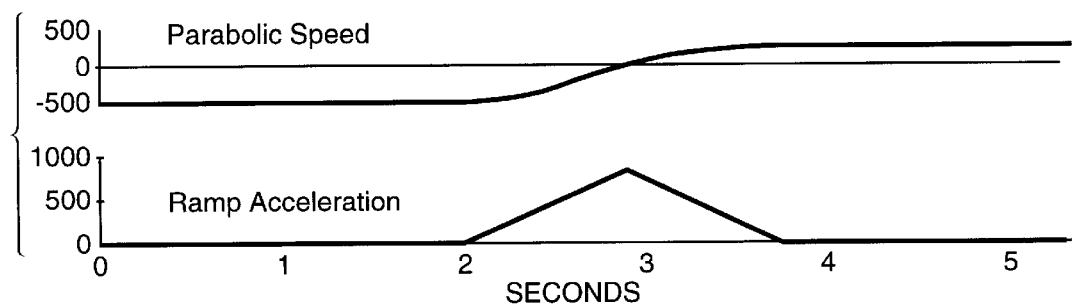
Fig-3-
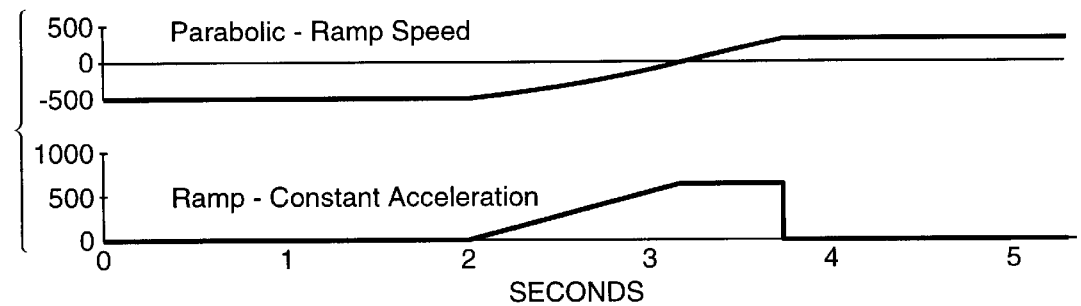
Fig-4-
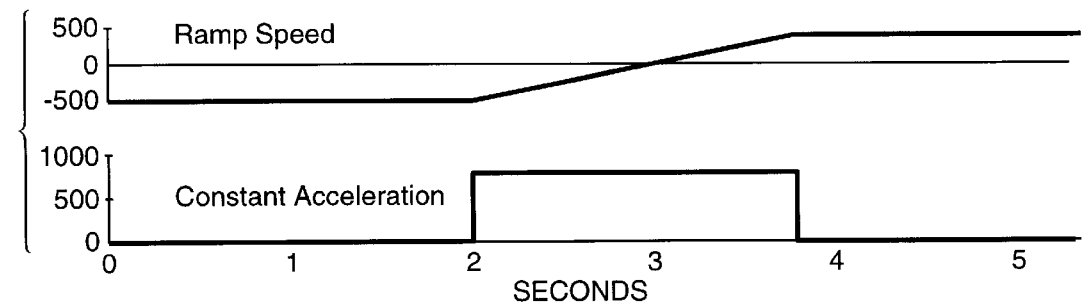
Fig-5-

FULL THROTTLE DIRECTIONAL SHIFT

This application claims the benefit of prior provisional patent application Ser. No. 60/113,472 filed Dec. 23, 1998.

TECHNICAL FIELD

The present invention relates generally to a device and a method for controlling ground speed of a machine under full throttle, and more particularly to an electrohydraulic control utilizing sliding mode for affecting a directional shift of the drive line of the machine including the engagement of a brake and a torque converter impeller clutch.

BACKGROUND ART

Use of the throttle as the primary ground speed control of a mobile earth working machine, such as a wheel loader, is generally precluded by the need to maintain full engine power to the auxiliary hydraulic equipment at low speeds. For example, if the throttle were reduced to slow the machine as the bucket enters a pile of material, there might be insufficient power available to lift the bucket though the pile for loading. Accordingly, ground speed has conventionally been controlled by braking and operation of a "left pedal", which mechanically disengages a clutch between the engine and transmission.

Manually controlling the degree of clutch slip needed to achieve a desired ground speed can be tiring for the operator. Further complicating the task is the need for the operator to simultaneously steer the machine and operate the hydraulic implement controls. It is therefore not surprising that various forms of assisted ground speed control have been found to contribute significantly to overall productivity and operator comfort.

It is further desirable to assist the operator with full throttle directional shifts, whereby the direction of rotation of the transmission output is reversed while the engine remains at close to full throttle. As the new gear and impeller clutch are fully engaged, uneven deceleration/acceleration often results in unacceptable levels of jerk, causing machine wear and operator discomfort, which can be reduced to some extent by first manually braking the machine.

In U.S. Pat. No. 5,040,648 to Mitchel et al., the impeller of a hydrodynamic torque converter is selectively engaged to the engine by hydraulically actuated impeller clutch discs, in order to adjust the ground speed at full throttle. An electrohydraulic system supplies pressurized fluid to the impeller clutch, for controlling the torque transmitted to the drive train in proportion to an impeller pedal position. Depression of the impeller pedal beyond a predetermined point may also progressively supply pressurized fluid to the service brakes for further reductions in ground speed. It remains difficult however, to maintain a controlled ground speed using such open loop control due to changes in torque on the drive train caused by obstacles, wheel slip and uneven terrain.

U.S. Pat. No. 5,509,520 to Evans et al. discloses a controller which utilizes proportional-integral (PI) closed loop control of an impeller clutch and brakes to maintain a desired ground speed. A reference ground speed is stored at the moment the impeller pedal is depressed and used to calculate a desired speed as a function of the impeller pedal position. An error signal based upon a comparison of desired speed with the current ground speed is fed back to the controller for generation of impeller clutch and brake pressure command signals to reduce the speed error.

PI control is very sensitive to modeling and measurement errors, and can not guarantee stability with varying drive train dynamics. While the aforementioned PI control is adequate for steady state conditions, it is slow to respond to transient conditions due to the low gain levels selected to avoid overshoot and chatter (caused by rapid switching between the brake and impeller clutch). Furthermore, system delays or dead time, such as fill times for the hydraulic actuator valves, may cause excessive wind-up in the integrator and result in unacceptable jerk as the valve engages abruptly.

The present invention is directed to overcoming one or more of the problems as set forth above.

DISCLOSURE OF THE INVENTION

An electrohydraulic control system and method is disclosed for controlling the ground speed of a machine having an engine operating at full throttle during a directional shift.

Ground speed control is accomplished through selective actuation of service brakes and a drive train including a transmission and a torque converter having an impeller clutch connecting an impeller element to a rotating external housing driving the transmission. The impeller clutch engages and disengages the engine from the transmission to selectively increase ground speed, while the service brakes reduce ground speed, according to hydraulic pressure signals from an electronic controller. A speed sensor responsive to sensed rotational speed of the drive train provides an actual speed signal representative of the current ground speed.

In one aspect of the present invention, ground speed control during full throttle directional shifts is accomplished by tracking a desired trajectory using closed-loop electronic control, such as a sliding mode control strategy. The desired trajectory is preferably a parabolic function in order to provide linear acceleration throughout the directional shift and a resulting constant jerk level.

Other details and advantages of the invention will become apparent by reference to the following description and illustrative drawings of certain present embodiments thereof and certain present preferred methods of practicing the same proceeds.

BRIEF DESCRIPTION OF THE DRAWINGS

A more complete appreciation of this invention will be understood by reference to the following detailed description when considered in conjunction with the accompanying drawings in which like reference symbols indicate the same or similar components, wherein:

FIGS. 3–5 show three different speed profiles and corresponding resulting acceleration profiles.

BEST MODE FOR CARRYING OUT THE INVENTION

Figure 1:
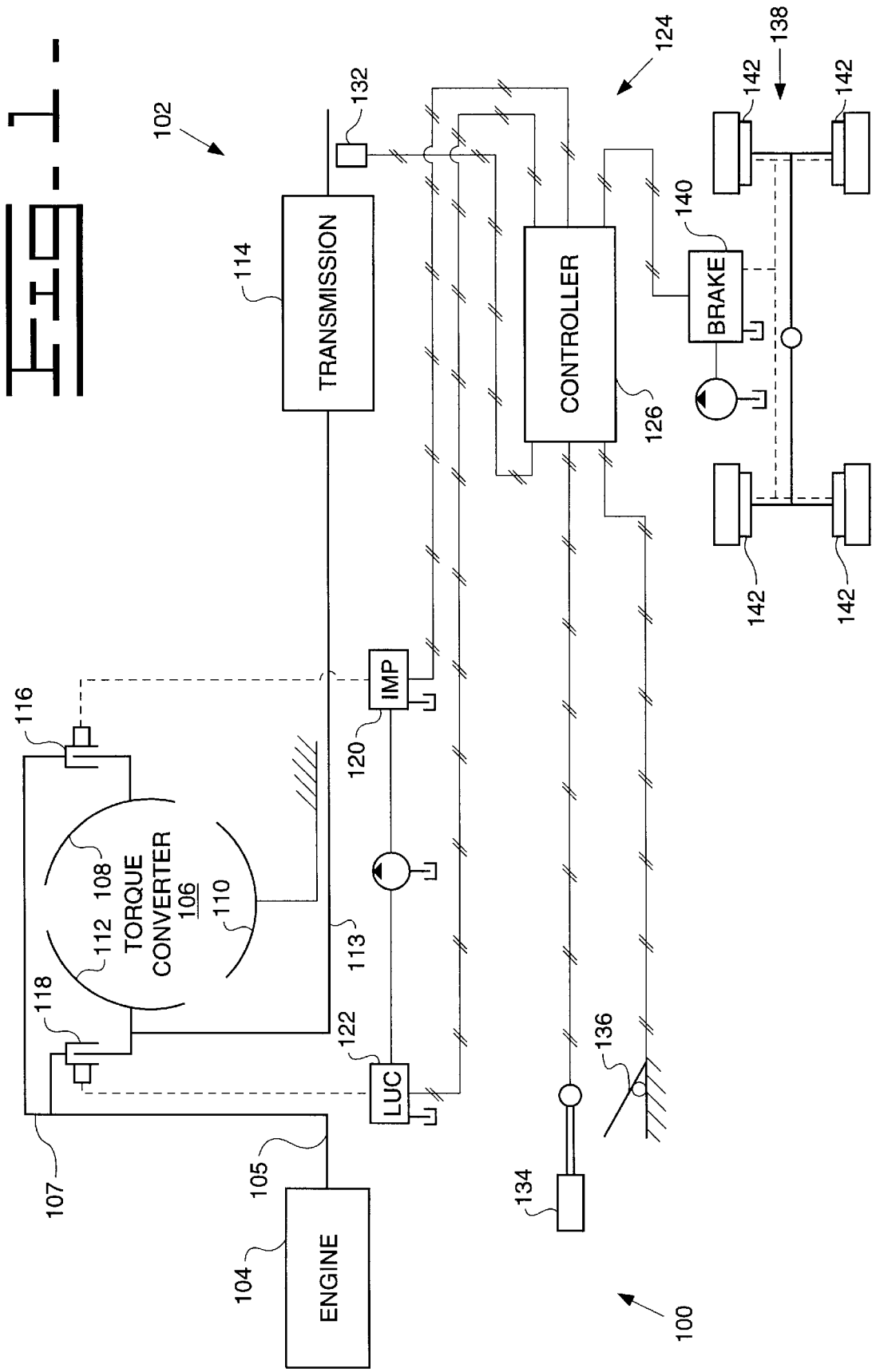
FIG. 1 shows a block diagram of an electrohydraulic drive system for a machine.

The present invention is directed toward controlling the ground speed of an earth working machine 100, such as a wheel loader. A power train 102 for the machine is schematically illustrated in FIG. 1. The power train includes an engine 104 having a shaft 105 connected to a hydrodynamic torque converter 106. The torque converter 106 includes rotating housing 107, an impeller element 108, a stat or element 110, and a turbine element 112 connected to a centrally located output shaft 113. The output shaft 113 provides the input to a multi-speed transmission 114 preferably having a plurality of interconnected planetary gear sets selectively engaged in cooperating groupings by operation of a pair of disc-type directional clutches and a plurality of disc-type speed clutches.

The drive train also includes a disc-type input clutch or impeller clutch 116 located between the engine 104 and the torque converter 106 for controllably coupling the rotating housing to the impeller element, and a disc-type lockup clutch 118 for selectively coupling the rotating housing to the turbine element and the output shaft for a direct mechanical connection that effectively bypasses the torque converter. An electrohydraulic impeller clutch valve 120 provides fluid flow to actuate the impeller clutch, while an electrohydraulic lockup clutch valve 122 provides fluid flow to actuate the lockup clutch.

An electrohydraulic control device 124 is provided to control the operation of the drive train. The controller includes an electronic controller 126 utilizing a processor. The term processor is meant to include microcomputers, microprocessors, integrated circuits, dedicated analog controllers and the like capable of generating commands as a mathematical function of monitored input signals. The electronic controller contains any necessary signal conditioning circuitry to convert input signals from a plurality of sensors and switches to a form usable by the processor, and solenoid driver circuitry for controlling valves supplying pressurized fluid to hydraulic actuators for transmission 114, impeller clutch 116, and lockup clutch 118 according to signals produced by the controller 126.

The electronic controller receives electrical signals from sensors located at various locations on the machine. For purposes of the present invention only a sensor for determining a representative ground speed is required, such as an optical or magnetic pickup 132 producing a signal corresponding to the rotational speed and direction of the transmission output shaft.

The electrohydraulic control device 124 includes an operator control handle 134 for selectively controlling the operation of the transmission. The control handle generates transmission control signals to the controller indicative of a desired gear ratio and/or direction of the machine. An operator impeller pedal 136 (alternatively "left pedal") is provided for operator selection of a desired ground speed, as described in the aforementioned U.S. Pat. No. 5,509,520 to Evans et al, but the operator selected speed is superceded by a continually changing target speed corresponding to a desired trajectory during a directional shift. Braking of the machine may be also be initiated manually through a service brake mechanism 138 in response to depression of the impeller pedal. An electrohydraulic brake valve 140 provides fluid flow to actuate front and rear brakes 142. It should be noted that the service brake mechanism may also include a brake pedal (not shown) for manually operating the front and/or rear brake sets. Moreover an accelerator pedal or other throttle control (not shown) is provided to manually control the speed of the engine.

The present invention employs a closed-loop ground speed control system using the transmission output speed and a desired trajectory as inputs and the impeller clutch and service brakes as the control actuators. The manner in which the machine speed is reduced and then increased in the opposite direction is referred to herein as a desired trajectory. A theoretical trajectory for the machine speed can be generated which, if properly tracked by a controller, can reverse machine direction within acceptable jerk levels.

Sliding mode (SM) controllers have been developed as a closed loop control for stabilizing non-linear systems, and are discussed in detail in an article entitled *Analysis and Control of Nonlinear Systems* by Karl J. Hedrick in the June, 1993 *Journal of Dynamic Systems, Measurement and Control*. SM control always pushes the system toward stability and has superior tracking performance to linear controllers such as PI in responding to transient inputs. The article discusses SM control in the general context of automotive power train control, and cites clutch and brake pressures among the list of controllable inputs, but does not address the problem of full throttle ground speed control. The present invention preferably uses sliding mode control to provide robust tracking of a desired trajectory for a directional shift.

Prior to initiation of a directional shift, the impeller clutch is fully engaged to transfer engine torque to the transmission, and the brakes are disengaged. Upon actuation of a shift lever (not shown) indicating a desired change of direction, a reference ground speed signal is sampled from a sensor 132. Any wheel slip which may be present is neglected in the present invention and the rotational speed of the transmission output shaft is considered to represent the ground speed of the machine. A target trajectory to slow and then accelerate the machine in the opposite direction over a given time period within acceptable jerk levels is then calculated or retrieved from a table and implemented by electrohydraulic controls. The effect of the control is to selectively disengage the impeller clutch and engage the brakes to decelerate the machine while the transmission gear is shifted, then selectively reengage the impeller clutch until fully engaged, all while maintaining the target trajectory. The current desired speed repeatedly changes over time to follow the target trajectory, and is compared to the measured transmission output speed to adjust fluid pressures according to the aforementioned sliding mode control.

In order to make the ground speed control as smooth as possible, as well as to simplify control to a single input/single output (SISO) system, it is desirable to control only the impeller clutch and brakes at one time. A switching criteria is utilized to switch from between a brake and impeller clutch pressure control laws on the basis of the magnitude of the machine speed. For example, when the magnitude of machine speed drops below some tolerance level at which applying torque in the opposite direction will not cause unacceptable jerk, the controller is switched from brake to impeller clutch.

Figure 2:
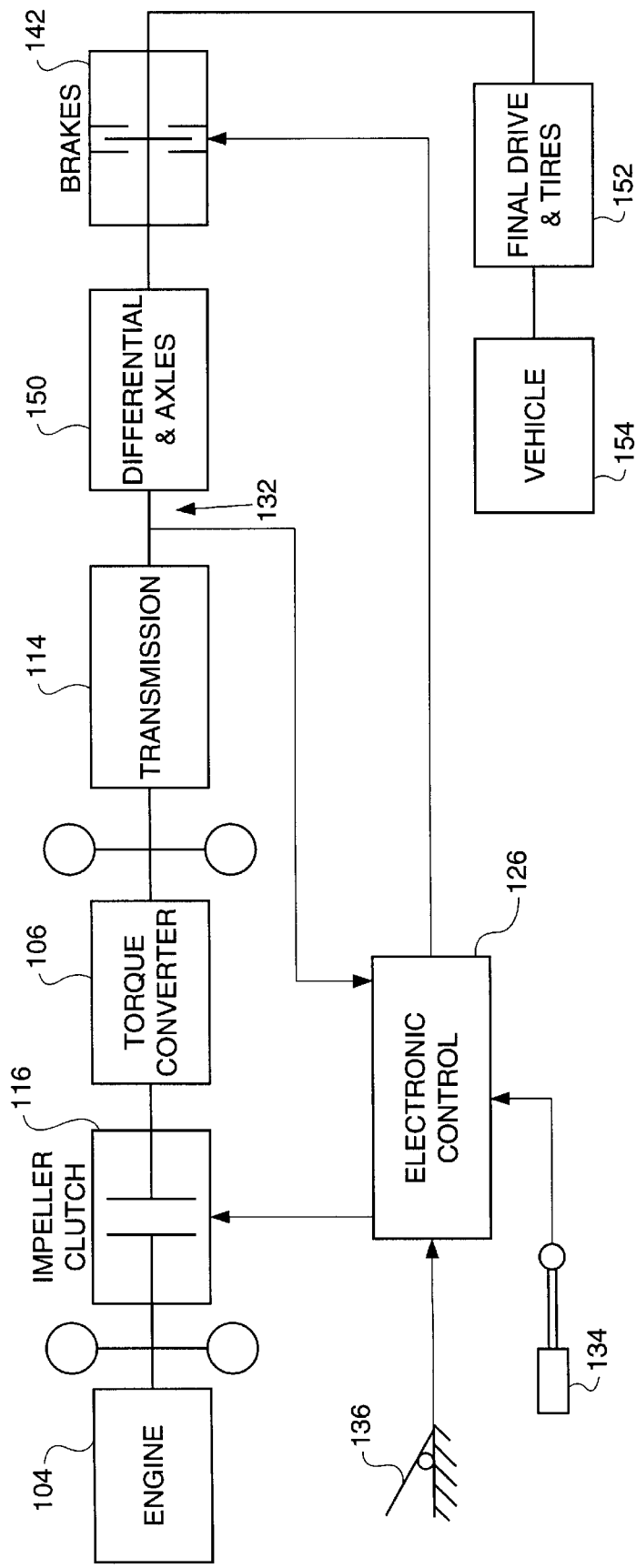
FIG. 2 shows a schematic diagram of the power train for a machine for directional shifts.

FIG. 2 schematically indicates the components of a drive train which are considered in developing a dynamic model of the drive train. For simplicity, only steady state dynamics are considered, i.e. when the vehicle is either in reverse or forward gear. In addition to the components previously discussed, FIG. 2 also identifies elements for which equations of motion are developed and then assembled based on the boundary conditions for each component in order to develop the control laws used by electronic controller 126, including the differential and axles 150, final drive and tires 152, and vehicle mass 154.

An exemplary equation for determining the brake pressure as a function of the machine dynamics and a desired deceleration function is as follows:

$$P_B = P_{Bprev} \frac{\left(I_{eqf} + \frac{tr}{sr} I_{ico} R_{IT} R_p R_{OT}\right) R_{eqf}}{A_B \mu_B D_B N_B} \left[\ddot{\theta}_{des} - \eta \cdot sat\left[\frac{(\dot{\theta}_D - \dot{\theta}_{des})}{\phi}\right]\right]$$

where $P_B$ is break pressure, $I_{eqf}$ is equivalent forward inertia, tr and sr are torque converter torque and speed ratios respectively, $I_{ico}$ is impeller clutch output inertia, R represents a gear ratio for the transmission input and output transfer gears, the planetary gears and final drive, $A_B$ is the brake piston area, $\mu_B$ is the brake coefficient of friction, $D_B$ is the brake mean diameter and $N_B$ is the number of brake discs. The value $\dot{\theta}_D$ is transmission output angular velocity, while $\dot{\theta}_{des}$ is determined according to a desired directional shift trajectory as further discussed hereinafter. The remaining terms in the brake control law are conventional sliding mode control operators, corresponding to a convergence factor $\eta$, a saturation function sat, and a boundary layer thickness $\phi$.

An exemplary equation for determining the clutch pressure as a function of the machine dynamics and a desired deceleration/acceleration function is as follows:

$$P_{IC} = P_{ICprev} + \frac{\left(\frac{1}{tr} I_{eqf} + \frac{1}{sr} I_{ico} R_{IT} R_p R_{OT}\right)}{A_{IC} \mu_{IC} D_{IC} N_{IC}} \left[\ddot{\theta}_{des} - \eta \cdot sat\left[\frac{(\dot{\theta}_D - \dot{\theta}_{des})}{\phi}\right]\right]$$

wherein the variables substantially correspond to those described in relation to the brake control law, but substituting impeller clutch pressure $P_{IC}$, and clutch area, friction coefficient, diameter, and number of discs.

Turning now to FIG. 3, a parabolic speed target trajectory is shown for providing a smooth transition from a speed of up to 500 RPM's in one direction to a similar speed in the opposite direction. The trajectory is used to supply successively changing desired speed values to first the brake control law and then the impeller clutch control law over a given time frame for the directional shift. Electronic control 126 utilizes a closed loop control law, such as sliding mode, to attempt to track the desired speed as the target changes.

The desired speed target values may be predetermined for a particular trajectory, such as by storage in a table having values which vary sequentially along a parabolic curve from 500 through 0 to 500 over a given time. If a directional shift is initiated at a lesser speed, it is a relatively simple matter to jump to that speed in the table and sequentially read out successive desired speed values from that point forward, and even to conclude the directional shift when a similar speed in the opposite direction is reached. Alternatively, controller 126 may calculate the trajectory according to a specified function and predetermined parameters, such as a start speed, end speed and shift duration.

FIG. 3 also illustrates a corresponding acceleration for the machine as it tracks a parabolic speed trajectory, representing the force felt by the machine operator. The parabolic speed trajectory is preferably computed in such a manner as to cause a substantially linear increase in acceleration up to the point at which the machine comes to a stop and begins accelerating in the opposite direction, whereupon the operator experiences a substantially linear decrease in the acceleration. Such a case is referred to herein as a ramp acceleration trajectory, and the maximum slope of the parabola is selected so as to keep the maximum acceleration (the peak of the ramp) within an acceptable level.

FIG. 4 illustrates one alternative speed trajectory referred to herein as a parabolic ramp speed trajectory. The desired speed values are computed according to a parabolic function for causing the machine to decelerate to a stop, followed by a linearly increasing speed in the opposite direction. The corresponding acceleration trajectory is referred to herein as ramp-constant acceleration, indicating the acceleration felt by the operator increases linearly during the parabolic decrease in speed, then remains constant during the linear increase in speed in the opposite direction.

A third alternative speed trajectory is illustrated in FIG. 5, referred to herein as a ramp speed trajectory. The speed trajectory is computed so as to decrease linearly through zero and then increase along the same slope in the opposite direction, resulting in a constant acceleration experienced by the operator and a correspondingly higher jerk at the beginning and the end of the directional shift. It should be understood that the trajectories proposed herein represent present preferred trajectories, but should not be construed as attempting to set forth all alternatives encompassed within the scope of the present invention as defined by the appended claims.

Industrial Applicability

With respect to the drawings and in operation, the present invention provides for a directional shift of a machine while the engine is running at near full power. More specifically, the electrohydraulic control device controllably actuates the impeller clutch and service brakes to control the ground speed according to a target speed trajectory which automatically maintains acceptably low jerk levels.

Other aspects, objects and advantages of the present invention can be obtained from a study of the drawings, the disclosure and the appended claims.

I claim:

1. An electrohydraulic control device for a drive train of a mobile machine including an engine and a transmission, comprising:
   a clutch for controlling the torque transmitted between the engine and the transmission;
   a set of brakes;
   electrohydraulic valve means, responsive to control signals, for supplying pressurized fluid to engage one of the clutch and brake set;
   a speed sensor for sensing a value representative of the ground speed of the machine and responsively producing a speed signal; and
   control means for receiving the sensed speed signal and generating said control signals for controlling the supply of pressurized fluid by said electrohydraulic valve to cause a directional change of the machine substantially according to a predetermined ground speed trajectory.

2. An electrohydraulic control device, as set forth in claim 1, wherein said control means selectively controls the impeller clutch and braking electrohydraulic valve according to a slide mode control strategy.

3. An electrohydraulic control device, as set forth in claim 1, wherein said control means causes said directional change while the engine remains at substantially full throttle.

4. An electrohydraulic control device, as set forth in claim 1, wherein said predetermined trajectory includes a parabolically increasing and decreasing speed.

5. An electrohydraulic control device, as set forth in claim 4, wherein said predetermined trajectory results in a ramp acceleration, having substantially a linearly increasing deceleration in a first direction followed by a linearly decreasing acceleration in the opposite direction.

6. An electrohydraulic control device, as set forth in claim 1, wherein said predetermined trajectory includes a parabolic decrease in speed until the ground speed approaches zero.

7. An electrohydraulic control device, as set forth in claim 6, wherein said predetermined trajectory includes a linearly increasing speed.

8. An electrohydraulic control device, as set forth in claim 7, wherein said predetermined trajectory results in a ramp-constant acceleration, having substantially a linearly increasing deceleration in a first direction followed by a constant acceleration in the opposite direction.

9. An electrohydraulic control device, as set forth in claim 1, wherein said predetermined trajectory includes a linear change in speed, resulting in a constant acceleration during said directional change.

10. A method for controlling a drive train of a machine including an engine, a transmission, a set of brakes and a braking electrohydraulic valve for producing fluid flow to the brake set to controllably engage and disengage the brake set in response to control signals, and a torque converter having a rotating housing and being drivingly connected between the engine and the transmission, wherein the torque converter includes an impeller element, an impeller clutch for connecting the impeller element to the rotating housing, and an impeller clutch electrohydraulic valve for producing fluid flow to the impeller clutch to controllably engage and disengage the impeller clutch in response to control signals, the method comprising the steps of:

sensing the output speed of the transmission and responsively producing a transmission output speed signal; and receiving the sensed speed signal and generating said control signals for controlling the supply of pressurized fluid by said electrohydraulic valves to cause a directional change of the machine substantially according to a predetermined ground speed trajectory.

* * * * *